Patented Mar. 19, 1940

2,193,792

UNITED STATES PATENT OFFICE 2,193,792

PREPARED RESIN

Ivan V. Wilson, Dayton, Ohio, assignor to Monsanto Chemical Company, St. Louis, Mo., a corporation of Delaware No Drawing. Application December 16, 1936, Serial No. 116,114

11 Claims. (Cl. 260—82)

This invention relates to synthetic resins, more particularly to resins produced by the action of metallic halides on cracked petroleum distillates.

The principal object of the invention is to provide improved resins from cracked petroleum distillates by the action of metallic halides, which resins have superior hardness and higher melting point, satisfactory solubility in hydrocarbon solvents and varnish oils, and satisfactory weathering characteristics.

A further object of the invention is to provide a method for the production of such an improved resin.

Other objects and advantages of the invention will be apparent from the description hereinafter when considered in conjunction with the appended claims.

The methods of producing hydrocarbon resins by treatment of cracked petroleum distillates with promoters of the Friedel-Crafts type are described in numerous patents and applications of Charles A. Thomas and/or Carroll A. Hochwalt, of which No. 1,836,629 of December 15, 1931, is particularly pertinent hereto. In general, the method consists in agitating for a short period of time a water-free hydrocarbon distillate rich in olefines, diolefines and aromatic hydrocarbons, having a distillation end-point not substantially in excess of 200° C., with a small proportion of an anhydrous metallic halide or other catalyst used in Friedel-Crafts reactions. The catalyst is then removed by the addition of an alcoholic alkali solution or with such other suitable substances which cause the precipitation of both the metallic portion of the metallic halide and the halide portion as compounds insoluble in the resulting mixture. The insoluble precipitated compounds and any insoluble compounds formed in the reaction promoted by the metallic halide catalyst are filtered off. The clear filtrate, containing the resin in solution, is then evaporated to such a point that the remaining resin has the desired hardness. In some cases additional hardening and enhanced properties are obtained in the resin by removing any high-boiling oils which may have been retained therein after the final evaporation by a treatment with superheated steam, whereby the oily polymeric substances are removed by volatilization with the steam.

The types of hydrocarbons which are suitable for the production of such unsaturated hydrocarbon resins include olefines, diolefines, aromatic hydrocarbons, alkylated aromatic hydrocarbons, and terpenes, all of which, with the possible exception of terpenes, occur to a greater or lesser extent in cracked petroleum distillates. The reactions by which the resins are formed are complex but include the condensation or combination of a member of one class of the hydrocarbons mentioned with a member of another class, accompanied by polymerization of the individual unsaturated hydrocarbons and/or polymerization of the condensed hydrocarbon products. In speaking of these multiple reactions which are comprehended in terms such as combination, condensation, mutual polymerization, co-polymerization, multiple polymerization, and the like, it has been considered advantageous to designate them in the one simple term, polymerization, which term throughout this specification is to be understood to have that broad significance.

Cracked petroleum distillates containing the hydrocarbons mentioned yield solid hard resinous bodies on treatment with metallic halides as indicated above. However, as is to be expected, much variation occurs in the resin manufacture when the cracked petroleum distillates are of different characters. To correct for such variations the addition of desirable fractions of cracked petroleum distillates or the blending of cracked distillates of different characters is practiced. The yields of resins change with the different types of cracked petroleum distillates likewise.

It has now been found that the addition of coal-tar solvent naphtha fractions having a boiling range of 165° to 185° C. to cracked petroleum distillates yields, by the treatment with metallic halides, resins of higher melting point, which are characterized by increased hardness, durability and resistance to weathering. The proportions of coal-tar solvent naphtha added influence the character of the resulting resins, including their solubility. Generally, with increasing solvent naphtha content, the solubility decreases in petroleum solvents.

With certain cracked petroleum distillates the treatment with metallic halide yields resinous products, some of which are soluble and others of which are insoluble in petroleum naphtha. The insoluble products are also insoluble in alcohol and other solvents and have a high fusion point. It has been known that the addition of an olefine such as amylene to the distillate, reduces or avoids the formation of the product insoluble in petroleum naphtha. It has now been found that the addition of a coal-tar fraction such as is indicated in this invention produces a similar result with a distillate yielding insoluble product, that is, the proportion of insoluble product formed is reduced to an appreciable extent. However, beyond a certain proportion of coal-tar addition, the solubility of the entire resin in petroleum naphtha is decreased, but the product is unlike the insoluble product previously mentioned.

The production of resins from coal-tar naphthas is well known in the art. Such resins are usually formed by polymerization with an agent such as sulfuric acid. When coal-tar fractions which yield resins by this treatment are reacted in the presence of metallic halides, however, the resin formed differs from the resin produced by the action of sulfuric acid, especially in melting point, hardness, solubility, and fusibility. Whereas the resin produced by the action of sulfuric acid is soluble in coal-tar naphtha and petroleum naphtha, that resulting from the treatment with metallic halides is insoluble therein at room temperature, is usually darker in color, brittle and frequently infusible.

It has also been observed that the same advantageous results produced in this invention are not obtained by mixing coal-tar resins polymerized in the presence of sulfuric acid with the hydrocarbon resins produced by the treatment of cracked petroleum distillates with metallic halides, nor by mixing resins resulting from the treatment of coal-tar fractions with metallic halides with resins produced by the treatment of cracked petroleum distillates with metallic halides.

The exact nature of the reactions which occur on subjecting a cracked petroleum distillate in admixture with a coal-tar naphtha fraction to the action of a metallic halide such as aluminum chloride are not clearly understood. The addition of pure aromatic hydrocarbons, such as benzene, toluene, naphthalene, etc., to the cracked petroleum distillate, followed by identical treatment with metallic halides, does not produce comparable resins.

The coal-tar solvent naphtha fractions yielding the best resins by the process of this invention have boiling ranges from about 165° to 190° C. Such fractions which have been washed with sulphuric acid and similar polymerizing reagents are ineffective. In view of this fact, the substances present in the coal-tar naphthas to which can be attributed the remarkable advantages of this invention are believed to be cumarone, indene, dicyclopentadiene and similar polymerizable constituents.

Examples of typical methods for practicing the invention follow. In these examples the cloud point is to be understood to be the temperature at which a heated solution of 2 grams of the resin in 20 grams of Stoddard solvent naphtha precipitates (clouds) on cooling. The melting points of the resins are those obtained by use of the A. S. T. M. ball and ring method. The Barrett color is the color of a solution of 2 grams of the resin in 20 grams of Stoddard solvent naptha expressed as a number corresponding to the so-called Barrett color standard numbers, a, value accepted in the art. The greater the Barrett color number, the darker is the color. By "reactivity" of the resin is meant its capacity for combining with glycerol and fatty oils, according to the methods described in the patents of Charles A. Thomas and/or Carroll A. Hochwalt, No. 2,023,495, 2,039,364, 2,039,365, 2,039,366 and 2,039,367. One test of "reactivity", as made in the laboratory, consists in heating 20 grams of the resin with 12 grams of blown castor oil and 6 grams of China-wood (tung) oil to 600 degrees F. The mixture is held at this temperature until a sample removed yields a hard ball or "pill" on cooling. The mixture is then thinned with 25 grams varnolene and coatings deposited therefrom are tested further for resistance to alkalies, weathering, etc. From the character of the "pill" formed in this manner is judged the "reactivity" of the resin.

*Repressured condensate No. 1.*—The cracked petroleum distillate used in the examples which follow was prepared in this manner: Through a tube furnace maintained at a temperature of 875 degrees C. was charged a fuel oil (Beacon No. 1) of gravity 41.8, having an initial boiling point of 336 degrees F. and a final boiling point of 535 degrees F. The oil was charged to the furnace at the rate of 0.56 gallon per hour, the time of contact during the cracking corresponding to 0.17 second. The yield of liquid products was 56.1 per cent of the charged stock. The liquid products were distilled. To the fraction boiling below 180° C. was then added under pressure butane and higher hydrocarbons, comprising the higher fractions of the gaseous products of the same pyrolysis. This repressuring operation, as it is called, was continued until the pressure of the material had reached 10 pounds at 98° F. The yield of repressured condensate made in this manner corresponded to 28.0% of the original charge stock. This condensate was dried over lime before use and consisted essentially of olefine, diolefine and aromatic hydrocarbons.

*Example 1.*—One liter of Repressured condensate No. 1 prepared above was dried over lime and slowly added with stirring to a suspension of 30 grams of anhydrous aluminum chloride in 400 cc. of dry petroleum naphtha. After one hour the solution mixture was neutralized with an alcoholic solution of sodium hydroxide. To aid in filtration of the precipitated solids and whatever insoluble resin may have formed, 20 grams of wood flour were added and the mixture was filtered under a carbon dioxide pressure of 10 pounds per square inch. The clear filtrate containing the resin in solution was evaporated until hard brittle resin remained and superheated steam was passed therethrough until no appreciable oily material was vaporized with the steam.

The resin yield thus obtained corresponded to 1.90 pounds per gallon of repressured condensate. It had a melting point of 92.4° C., and a color of 6 on the Barrett scale.

*Example 2.*—A mixture of 900 cc. of Repressured condensate No. 1 prepared as above described and 100 cc. of a coal-tar solvent naphtha having a boiling range of 170° to 185° C. was polymerized with aluminum chloride and the resin recovered in exactly the same way as in Example 1.

The yield of resin corresponded to 1.96 pounds per gallon and it had a melting point of 117° C. Both the reactivity and alkali resistance of the resin were satisfactory. The resin was completely soluble in petroleum solvents and its color corresponded to 4 on the Barrett scale.

If desired, the coal-tar solvent naphtha fraction can be added to the reacted mixture of Example 1 before removing the aluminum chloride.

*Example 3.*—A mixture of 800 cc. of Repressured condensate No. 1 prepared as above together with 200 cc. of the coal-tar solvent naphtha used in Example 2 was polymerized and treated as in Example 1.

The resin formed corresponded to a yield of 2.13 pounds per gallon of repressured condensate. Its melting point was 126° C., and it had a color of 4 on the Barrett scale. The reactivity and alkali resistance thereof were good and it was completely soluble in petroleum solvents, the cloud point in Stoddard standard naphtha being 19.5° C.

*Example 4.*—A mixture of 700 cc. of Repressured condensate No. 1 prepared as above, together with 300 cc. of the same coal-tar solvent naphtha used in Example 2 was treated as in Example 1.

The resin yield corresponded to 2.4 pounds per gallon. Its melting point was 134.2° C. The resin had a color of 4 on the Barrett scale, good reactivity and alkali resistance and was soluble in petroleum solvents. The cloud point was above 20° C. in Stoddard standard naphtha.

*Example 5.*—Exactly as in Example 1 a mixture of 600 cc. of Repressured condensate No. 1 prepared as above and 400 cc. of coal-tar naphtha used in Example 2 was treated.

The yield of resin corresponded to 2.4 pounds per gallon. Its melting point was 135.3° C., and the color corresponded to 2.5 on the Barrett scale. The reactivity and alkali resistance thereof were both good and the resin was soluble in petroleum solvents. The cloud point in Stoddard standard naphtha was above 20° C.

It will be noted that the yield and melting point increases with increasing concentration of coal-tar solvent naphtha while the alkali resistance and reactivity is improved in the same order. These facts will also be noted in the succeeding examples. Approximately 20 per cent of coal-tar solvent naphtha appears to be sufficient to produce advantageous results. The resins thus prepared are not as resistant to after-yellowing on exposure to light as are the resins prepared from cracked petroleum distillates without the addition of coal-tar fractions, yet their resistance is remarkable in comparison with other commercial varnish resins.

*Repressured condensate No. 2.*—In the examples which follow another repressured condensate was used. This condensate was prepared from a fuel oil (Beacon No. 2) of gravity 33.4 with an initial boiling point of 355° F. and a final boiling point of 566° F. This oil was cracked in a tube furnace at a temperature of 875° C. at a charging rate of 0.54 gallon per hour, corresponding to a contact time of 0.17 second. The yield of liquid products was 58.1% of the charge stock. The fraction of the liquid products boiling up to 200° C. was repressured with the butane and higher hydrocarbon fraction of the gaseous pyrolytic products to a pressure of 10 pounds per square inch at 98° F. The repressured condensate corresponded to 31.7% of the original charge stock. The condensate was dried before use.

*Example 6.*—One liter of Repressured condensate No. 2 thus prepared was slowly added with stirring to a suspension of 30 grams of anhydrous aluminum chloride in 400 cc. of dry petroleum naphtha. From this, the resin was recovered as in Example 1. The yield of resin corresponded to 1.87 pounds per gallon of repressured condensate. The melting point was 93° C., and it had a color of 6 on the Barrett scale.

*Example 7.*—To 800 cc. of Repressured condensate No. 2 prepared above were added 200 cc. of the coal-tar solvent naphtha used in Example 2. The mixture was polymerized and treated as before in Example 1.

The resin yield corresponded to 2.15 pounds per gallon of original repressured condensate. The color of the resin was 3 on the Barrett scale and its melting point was 118° C. The reactivity and alkali resistance were both very good. A coating made from this resin did not exhibit the after-yellowing characteristics of coal-tar resins.

The same advantageous results accruing from this invention can be obtained by adding cumarone-indene fractions previously polymerized with sulfuric acid, for example, commercial cumarone-indene resins, to a cracked petroleum distillate and subsequently polymerizing the mixture with aluminum chloride or other suitable metallic halide in the manner usually pursued for the production of the petroleum hydrocarbon resin. The cumarone resin, or polymerized cumarone-indene fraction, can also be added during a later stage of the polymerization of the cracked petroleum distillate, if desired, and the resin product recovered in the usual manner.

Inasmuch as the above examples constitute preferred embodiments of the invention it is to be understood that the invention is not limited thereto and that changes, modifications and wide variations in proportions can be made therein without departing substantially from the scope thereof, which is defined in the following claims.

What I claim is:

1. The petroleum-naphtha-soluble polymerization product obtained by polymerizing a mixture of a liquid cracked petroleum distillate, rich in olefines, diolefines and aromatics, and a coal-tar solvent naphtha fraction having a boiling range in the range of approximately 165°–185° C. in the presence of a Friedel-Crafts polymerizing agent.

2. In the production of hydrocarbon resins soluble in petroleum naphtha by the polymerization of a cracked petroleum distillate rich in olefines, diolefines and aromatic hydrocarbons in the presence of a Friedel-Crafts catalyst, the improvement whereby the melting point of the resin is increased while at the same time the solubility in petroleum naphtha is preserved, characterized in that the cracked petroleum distillate is admixed with a coal-tar-solvent-naphtha fraction having a boiling range in the range of approximately 165° to 185° C. and the mixture is thereafter subjected to polymerization in the presence of the Friedel-Crafts catalyst.

3. The process as defined in claim 2 and further characterized in that the coal-tar-solvent-naphtha fraction is subjected to preliminary polymerization to form a petroleum-naphtha-soluble polymer before admixture with the cracked petroleum distillate and the mixture is thereafter subjected to polymerization in the presence of the Friedel-Crafts catalyst.

4. The process as defined in claim 2 and further characterized in that the cracked petroleum distillate fraction is subjected to preliminary polymerization with the Friedel-Crafts catalyst before admixture with the coal-tar-solvent-naphtha fraction and the mixture is thereafter subjected to further polymerization in the presence of the Friedel-Crafts catalyst.

5. The method as defined in claim 2 and further characterized in that the coal-tar-solvent-naphtha fraction is polymerized to petroleum-naphtha-soluble resin, the resin is recovered therefrom, and this resin is admixed with the cracked petroleum distillate and the mixture is thereafter subjected to polymerization in the presence of the Friedel-Crafts catalyst.

6. In the process of polymerizing a cracked petroleum distillate rich in olefines, diolefines and aromatic hydrocarbons with a Friedel-Crafts catalyst, which process yields resinous products soluble in petroleum naphtha and also products insoluble in petroleum naphtha, the improvement whereby the yield of petroleum-naphtha-insoluble products is reduced and the yield of petroleum-naphtha-soluble resinous products is increased, characterized in that the cracked petroleum distillate is admixed with a coal-tar-solvent-naphtha fraction having a boiling range in the range of approximately 165° to 185° C. and the mixture is thereafter subjected to polymerization in the presence of the Friedel-Crafts catalyst.

7. The process as defined in claim 6 and further characterized in that the coal-tar-solvent-naphtha fraction is subjected to preliminary polymerization to form a petroleum-naphtha-soluble polymer before admixture with the cracked petroleum distillate and the mixture is thereafter subjected to polymerization in the presence of the Friedel-Crafts catalyst.

8. The process as defined in claim 6 and further characterized in that the cracked petroleum distillate fraction is subjected to preliminary polymerization with the Friedel-Crafts catalyst before admixture with the coal-tar-solvent-naphtha fraction and the mixture is thereafter subjected to further polymerization in the presence of the Friedel-Crafts catalyst.

9. The method as defined in claim 6 and further characterized in that the coal-tar-solvent-naphtha fraction is polymerized to petroleum-naphtha-soluble resin, the resin is recovered therefrom, and this resin is admixed with the cracked petroleum distillate and the mixture is thereafter subjected to polymerization in the presence of the Friedel-Crafts catalyst.

10. In the production of hydrocarbon resins soluble in petroleum naphtha by the polymerization of a cracked petroleum distillate rich in olefins, diolefins and aromatic hydrocarbons with a Friedel-Crafts catalyst, the improvement whereby the melting point is increased while at the same time the solubility in petroleum naphtha is preserved, characterized in that prior to the complete polymerization of the cracked petroleum distillate by the Friedel-Crafts catalyst to form resin there is added thereto a coal-tar material selected from the group consisting of coal-tar solvent naphtha fractions having boiling ranges within the range of approximately 165° to 190° C. and petroleum-naphtha-soluble polymers thereof, and the mixture is thereafter subjected to further polymerization in the presence of the Friedel-Crafts catalyst.

11. In the production of hydrocarbon resins soluble in petroleum naphtha by the polymerization of a cracked petroleum distillate rich in olefins, diolefins and aromatic hydrocarbons with a Friedel-Crafts catalyst, the improvement whereby the melting point is increased while at the same time the solubility in petroleum naphtha is preserved, characterized in that a hydrocarbon product selected from the group consisting of said cracked petroleum distillates and partial polymers of said cracked petroleum distillates containing petroleum-naphtha soluble polymeric constituents, is admixed with a coal-tar material selected from the group consisting of coal-tar solvent naphtha fractions having boiling ranges within the range of approximately 165° to 190° C. and petroleum-naphtha-soluble polymers thereof, and the mixture is thereafter subjected to polymerization in the presence of the Friedel-Crafts catalyst.

IVAN V. WILSON.